United States Patent
Chen et al.

(10) Patent No.: US 10,473,259 B1
(45) Date of Patent: Nov. 12, 2019

(54) INSTALLATION ASSEMBLY AND DISPLAY DEVICE THEREWITH

(71) Applicant: Wistron Corporation, New Taipei (TW)

(72) Inventors: Kuang-Wen Chen, New Taipei (TW); Ming-Yen Tsai, New Taipei (TW)

(73) Assignee: Winstron Corporation, New Taipei (TW)

( * ) Notice: Subject to any disclaimer, the term of this patent is extended or adjusted under 35 U.S.C. 154(b) by 0 days.

(21) Appl. No.: 16/181,347

(22) Filed: Nov. 6, 2018

(30) Foreign Application Priority Data

Jul. 30, 2018 (TW) .............................. 107126316 A

(51) Int. Cl.
*F16M 11/04* (2006.01)
*G06F 1/16* (2006.01)
*F16M 13/00* (2006.01)
*F16M 11/00* (2006.01)

(52) U.S. Cl.
CPC .......... *F16M 11/043* (2013.01); *F16M 11/00* (2013.01); *F16M 13/00* (2013.01); *G06F 1/1601* (2013.01); *G06F 2200/1612* (2013.01)

(58) Field of Classification Search
CPC ...... F16M 11/00; F16M 11/043; F16M 13/00; G06F 1/1601
See application file for complete search history.

(56) References Cited

U.S. PATENT DOCUMENTS

| | | | |
|---|---|---|---|
| 2005/0068718 A1* | 3/2005 | Cheng ................. | F16M 11/041 361/679.22 |
| 2005/0157457 A1* | 7/2005 | Kim ..................... | G06F 1/1601 361/679.27 |
| 2007/0168593 A1* | 7/2007 | Montag ................ | G06F 1/1601 710/303 |
| 2010/0188812 A1* | 7/2010 | Morrison ............. | F16M 11/041 361/679.58 |
| 2018/0114548 A1* | 4/2018 | Yonemaru ........... | F16F 7/00 |
| 2019/0141848 A1* | 5/2019 | Sung .................... | G06F 1/1607 |
| 2019/0261525 A1* | 8/2019 | Chiu .................... | F16M 11/046 |

FOREIGN PATENT DOCUMENTS

TW I513931 B 12/2015

* cited by examiner

*Primary Examiner* — Nidhi Thaker
(74) *Attorney, Agent, or Firm* — Winston Hsu

(57) ABSTRACT

The present disclosure relates to an installation assembly configured to mount an extension module on a supporting frame. The installation assembly includes a main body, a supporting mechanism, and an upper engaging component. The supporting mechanism is disposed on a rear side of the main body away from the supporting frame and configured to mount the extension module. The upper engaging component is connected to a top portion of the main body and configured to engage with a top portion of the supporting frame. In such a way, the extension module can be mounted on the supporting frame easily by the installation assembly of the present disclosure. The present disclosure can effectively simplify assembly and disassembly processes and save time of assembly and disassembly.

16 Claims, 14 Drawing Sheets

INSTALLATION ASSEMBLY AND DISPLAY DEVICE THEREWITH

BACKGROUND OF THE INVENTION

1. Field of the Invention

The present disclosure relates to an installation assembly and a display device therewith, and more particularly, to an installation assembly configured to mount an extension module on a supporting frame, and a display device therewith.

2. Description of the Prior Art

With the trend of thin and lightweight design of electronic devices, a system host, such as a personal computer, can be placed on any position including but not limited to a desktop. For example, a barebone host with a lightweight feature can be selectively fastened onto a rear side of a monitor depending upon demands and habits of a user. However, the conventional system host is usually fastened onto the monitor by screwing, and it is not convenient in assembly and disassembly of the system host and the monitor. When it is desired to maintain the system host, it is required to use an additional tool to disassemble the system host from the monitor. Furthermore, there is a fixing mechanism in the market for fixing the system host on a stand of the monitor. However, such fixing mechanism is not universal and only suitable for a stand with a designated size. A user needs to replace the fixing mechanism with another stand according to a size of the stand. Therefore, to provide a fixing mechanism suitable for an extensive range of sizes to allow a user to assemble the system host on the monitor or disassemble the system host from the monitor easily becomes an important topic in the field.

SUMMARY OF THE INVENTION

Therefore, the present disclosure is to provide an installation assembly configured to mount an extension module on a supporting frame, and a display device therewith for solving the aforementioned problem.

In order to achieve the aforementioned objective, the present disclosure discloses an installation assembly configured to mount an extension module on a supporting frame. The installation assembly includes a main body, a supporting mechanism and an upper engaging component. The supporting mechanism is disposed on a rear side of the main body away from the supporting frame and configured to mount the extension module. The upper engaging component is connected to a top portion of the main body and configured to engage with a top portion of the supporting frame.

According to an embodiment of the present disclosure, the upper engaging component is detachably connected to the top portion of the main body.

According to an embodiment of the present disclosure, the upper engaging component includes an abutting portion and an engaging portion. The abutting portion is connected to the top portion of the main body and abuts against a top surface of the top portion of the supporting frame, and the engaging portion is connected to the abutting portion and abuts against a lateral surface of the top portion adjacent to the top surface of the top portion of the supporting frame.

According to an embodiment of the present disclosure, an accommodating portion is formed on the upper engaging component and configured to accommodate the top portion of the supporting frame, and a shape of the accommodating portion is corresponding to a shape of the top portion of the supporting frame.

According to an embodiment of the present disclosure, the installation assembly further includes a lower engaging component adjacent to a bottom portion of the main body and configured to restrain the supporting frame cooperatively with the main body.

According to an embodiment of the present disclosure, the installation assembly further includes a lateral engaging mechanism movably installed on the main body and configured to abut against the supporting frame.

According to an embodiment of the present disclosure, the lateral engaging mechanism includes at least one lateral engaging component and a driving component. At least one sliding column protrudes from the at least one lateral engaging component. At least one sliding slot is formed on the driving component. A longitudinal direction of the at least one sliding slot is inclined relative to a horizontal direction. The at least one sliding column slidably passes through the at least one sliding slot. When the driving component slides relative to the main body along a vertical direction perpendicular to the horizontal direction, the at least one lateral engaging component is driven by cooperation of the at least one sliding column and the at least one sliding slot to slide relative to the main body along the horizontal direction to abut against the supporting frame in the horizontal direction.

According to an embodiment of the present disclosure, the lateral engaging mechanism further includes at least one guiding column disposed on the main body. At least one guiding slot is formed on the driving component. A longitudinal direction of the at least one guiding slot is parallel to the vertical direction, and the at least one guiding column slidably passes through the at least one guiding slot to guide the driving component to slide relative to the main body along the vertical direction.

According to an embodiment of the present disclosure, the lateral engaging mechanism further includes a first recovering component connected to the driving component and the main body to drive the driving component to recover along the vertical direction.

According to an embodiment of the present disclosure, the lateral engaging mechanism further includes at least one rotary engaging component pivoted to the at least one lateral engaging component and configured to rotatably engage with the supporting frame.

According to an embodiment of the present disclosure, the lateral engaging mechanism further includes at least one second recovering component disposed between the at least one rotary engaging component and the at least one lateral engaging component to drive the at least one rotary engaging component to rotatably engage with the supporting frame.

According to an embodiment of the present disclosure, the supporting mechanism includes a supporting component. At least one gourd hole is formed on the supporting component. The at least one gourd hole includes an enlarged portion and a holding portion, and at least one step screw of the extension module is fixed on the supporting component by the holding portion.

According to an embodiment of the present disclosure, the supporting mechanism further includes a restraining component movably installed on the supporting component and configured to restrain the at least one step screw of the extension module within the holding portion.

According to an embodiment of the present disclosure, the restraining component includes at least one restraining portion and at least one operating portion. The at least one restraining portion is installed on a side of the at least one gourd hole and slidable along a horizontal direction. The at least one operating portion is connected to the at least one restraining portion and configured to drive the at least one restraining portion to move along the horizontal direction to obstruct the enlarged portion, so as to restrain the at least one step screw from entering the enlarged portion from the holding portion.

In order to achieve the aforementioned objective, the present disclosure further discloses a display device including a display module, an extension module and an installation assembly. The display module includes a monitor and a supporting frame. The monitor is configured to display images. The supporting frame is configured to support the monitor. The installation assembly is configured to mount the extension module on the supporting frame. The installation assembly includes a main body, a supporting mechanism and an upper engaging component. The supporting mechanism is disposed on a rear side of the main body away from the supporting frame and configured to mount the extension module. The upper engaging component is connected to a top portion of the main body and configured to engage with a top portion of the supporting frame.

According to an embodiment of the present disclosure, an accommodating portion is formed on the upper engaging component and configured to accommodate the top portion of the supporting frame, and a shape of the accommodating portion is corresponding to a shape of the top portion of the supporting frame.

According to an embodiment of the present disclosure, the installation assembly further includes a lower engaging component adjacent to a bottom portion of the main body and configured to restrain the supporting frame cooperatively with the main body.

According to an embodiment of the present disclosure, the installation assembly further includes a lateral engaging mechanism movably installed on the main body and configured to abut against the supporting frame. The lateral engaging mechanism includes at least one guiding column, at least one lateral engaging component, a driving component and a first recovering component. The at least one guiding column is disposed on the main body. At least one sliding column protrudes from the at least one lateral engaging component. At least one sliding slot and at least one guiding slot are formed on the driving component. A longitudinal direction of the at least one sliding slot is inclined relative to a horizontal direction. A longitudinal direction of the at least one guiding slot is parallel to a vertical direction perpendicular to the horizontal direction. The at least one sliding column slidably passes through the at least one sliding slot. The at least one lateral engaging component is driven by cooperation of the at least one sliding column and the at least one sliding slot to slide relative to the main body along the horizontal direction to abut against the supporting frame in the horizontal direction when the driving component slides relative to the main body along the vertical direction, and the at least one guiding column slidably passes through the at least one guiding slot to guide the driving component to slide relative to the main body along the vertical direction. The first recovering component is connected to the driving component and the main body to drive the driving component to recover along the vertical direction.

According to an embodiment of the present disclosure, the lateral engaging mechanism further includes at least one rotary engaging component and at least one second recovering component. The at least one rotary engaging component is pivoted to the at least one lateral engaging component and configured to rotatably engage with the supporting frame. The at least one second recovering component is disposed between the at least one rotary engaging component and the at least one lateral engaging component to drive the at least one rotary engaging component to rotatably engage with the supporting frame.

According to an embodiment of the present disclosure, the supporting mechanism includes a supporting component and a restraining component. The extension module includes at least one step screw. At least one gourd hole is formed on the supporting component. The at least one gourd hole includes an enlarged portion and a holding portion, and the restraining component is movably installed on the supporting component and configured to restrain the at least one step screw of the extension module within the holding portion.

In summary, in the present disclosure, the installation assembly can be firmly combined with the supporting frame by the upper engaging component and the lateral engaging mechanism, and the extension module can be mounted on the supporting mechanism of the installation assembly by cooperation of the step screw and the gourd hole. Therefore, it provides a convenient way for a user to quickly assemble or disassemble the extension module without any additional tool. The present disclosure can effectively simplify assembly and disassembly and save time. Furthermore, the upper engaging component and the lateral engaging mechanism of the installation assembly of the present disclosure can be replaced or adjusted according to a shape or a size of the supporting frame of the display module. Therefore, the installation assembly can firmly combined with the supporting frames with different sizes and can be used universally.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
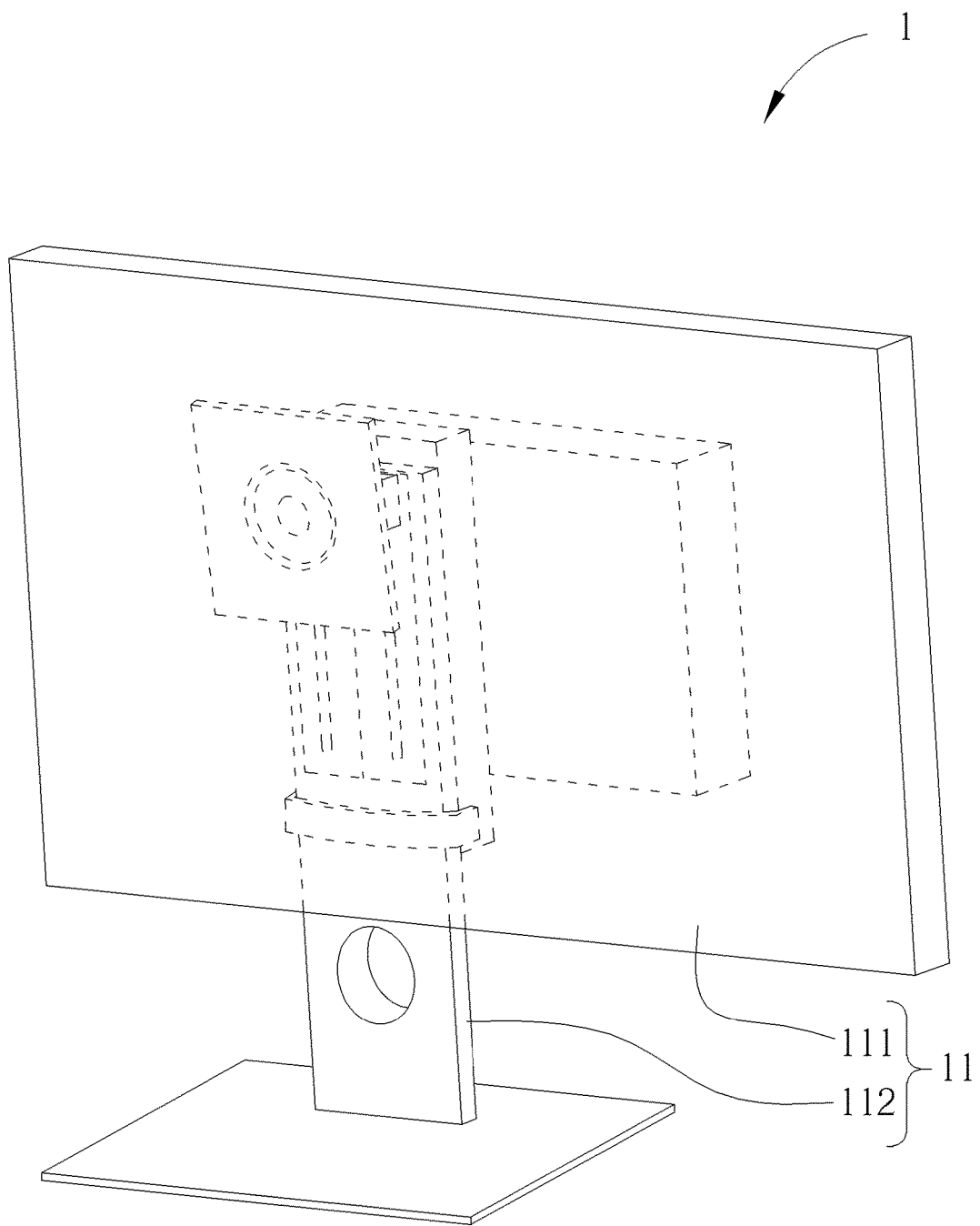
FIG. 1 and FIG. 2 are schematic diagrams of a display device at different views according to a first embodiment of the present disclosure.
Figure 2:
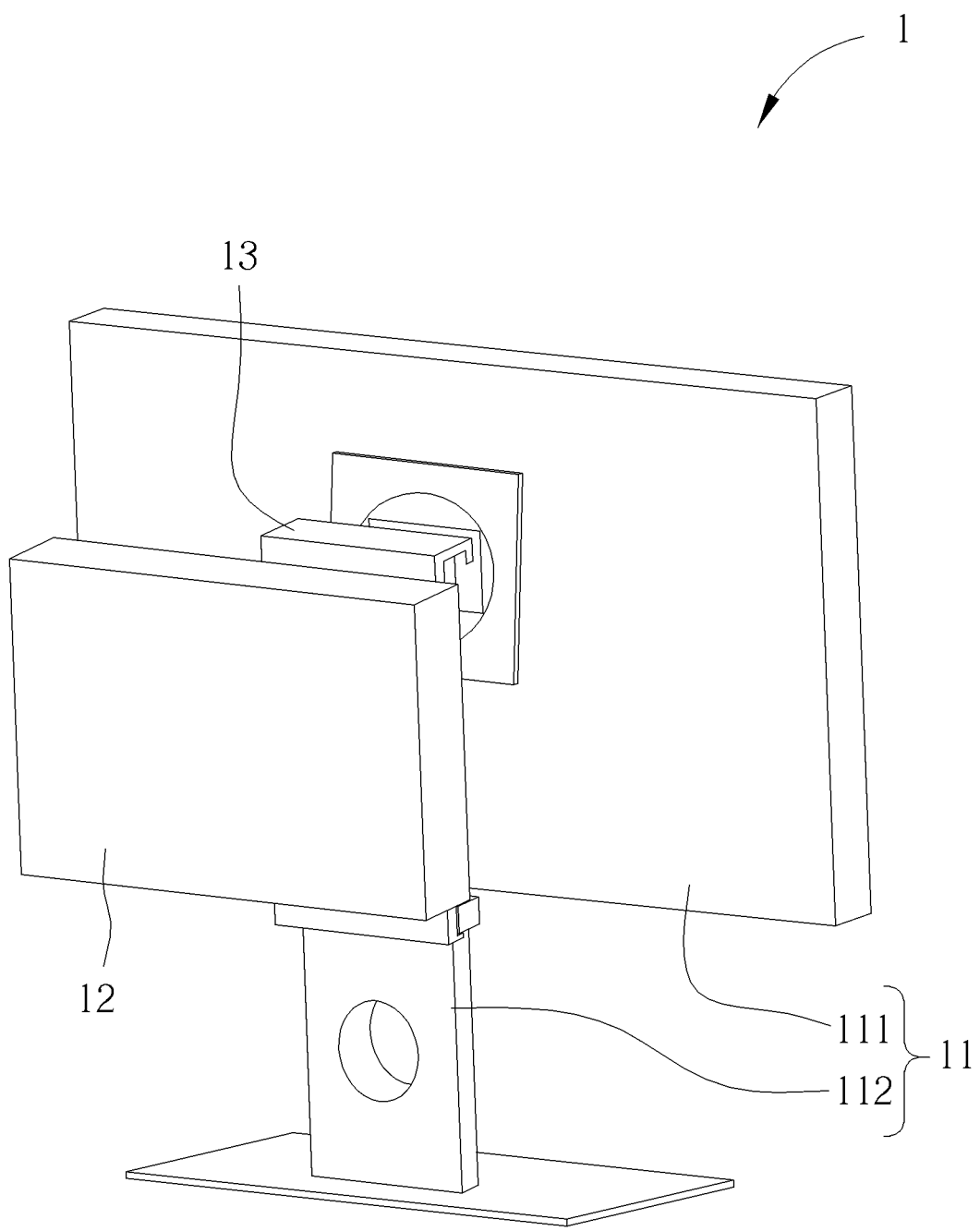
Figure 3:
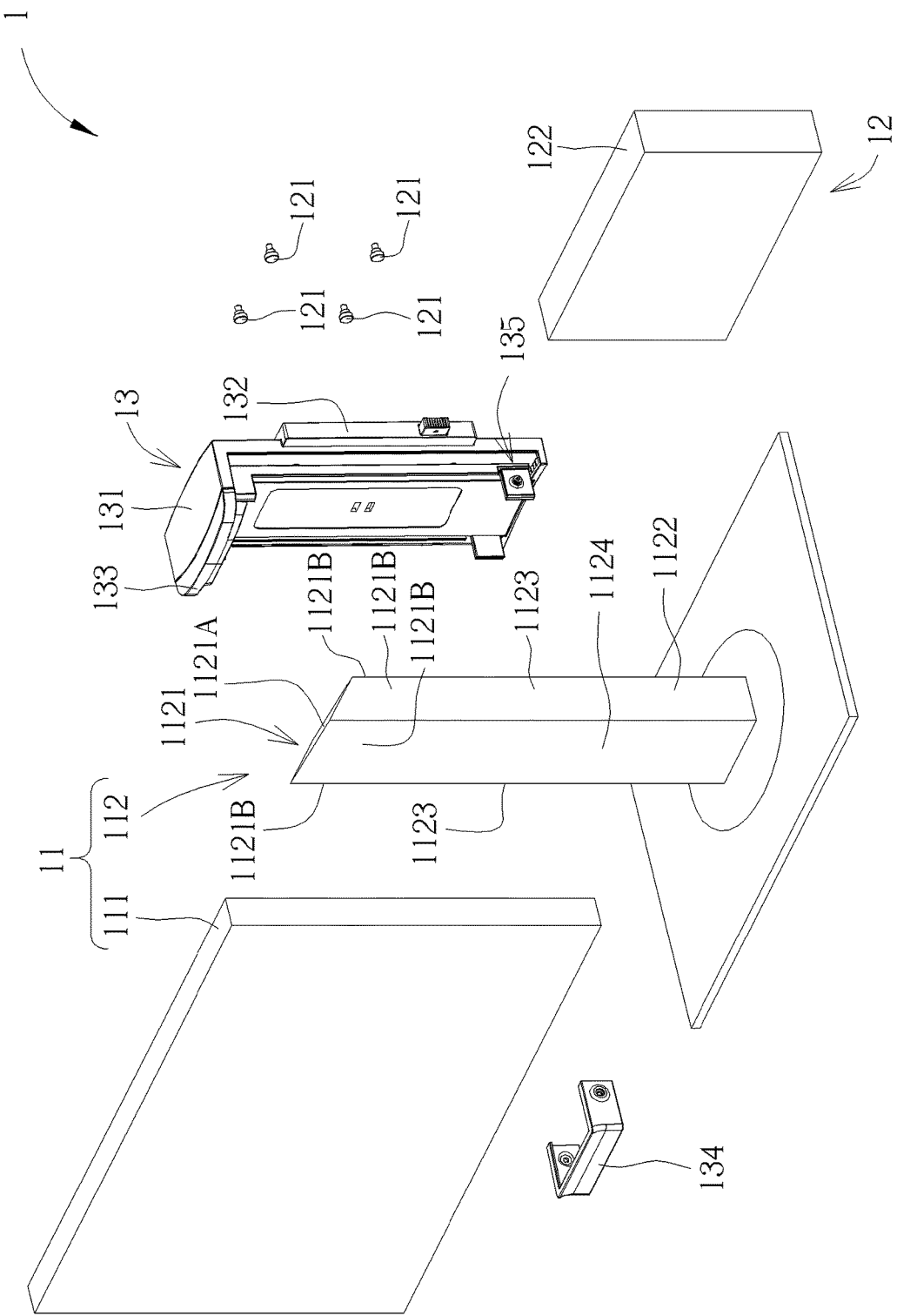
FIG. 3 and FIG. 4 are exploded diagrams of the display device at different views according to the first embodiment of the present disclosure.
Figure 4:
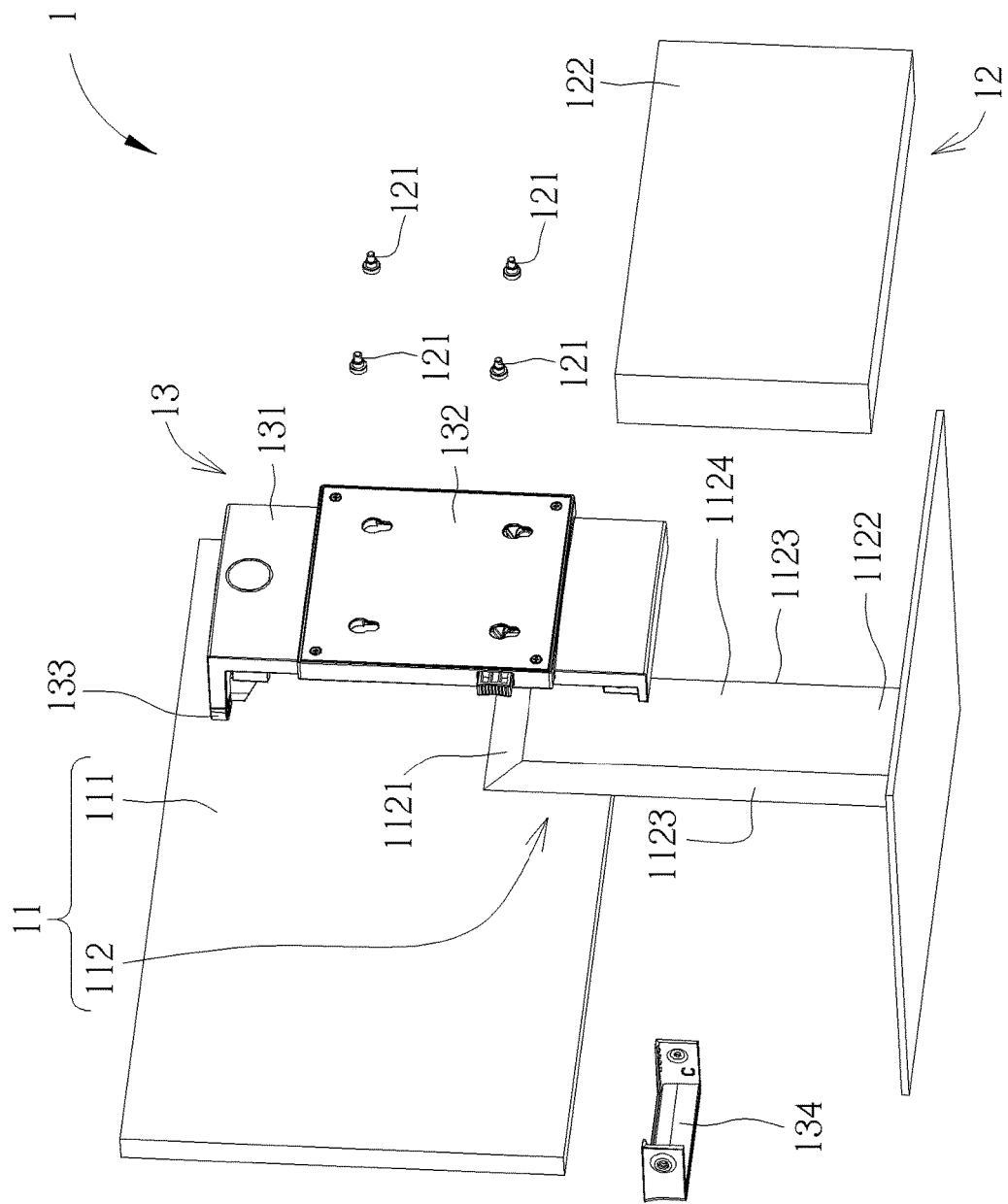

Please refer to FIG. 1 to FIG. 4. FIG. 1 and FIG. 2 are schematic diagrams of a display device 1 at different views according to a first embodiment of the present disclosure. FIG. 3 and FIG. 4 are exploded diagrams of the display device 1 at different views according to the first embodiment of the present disclosure. As shown in FIG. 1 to FIG. 4, the display device 1 includes a display module 11, an extension module 12 and an installation assembly 13. The display module 11 includes a monitor 111 and a supporting frame 112. The monitor 111 is configured to display images. The supporting frame 112 is connected to the monitor 111 and configured to support the monitor 111. The installation assembly 13 is configured to mount the extension module 12 onto the supporting frame 112 of the display module 11. In this embodiment, the extension module 12 can be a host module, such as a barebone host. However, it is not limited thereto. In another embodiment, the extension module 12 also can be a mobile phone module, a tablet module and a set-top box module. It depends on practical demands.

Figure 5:
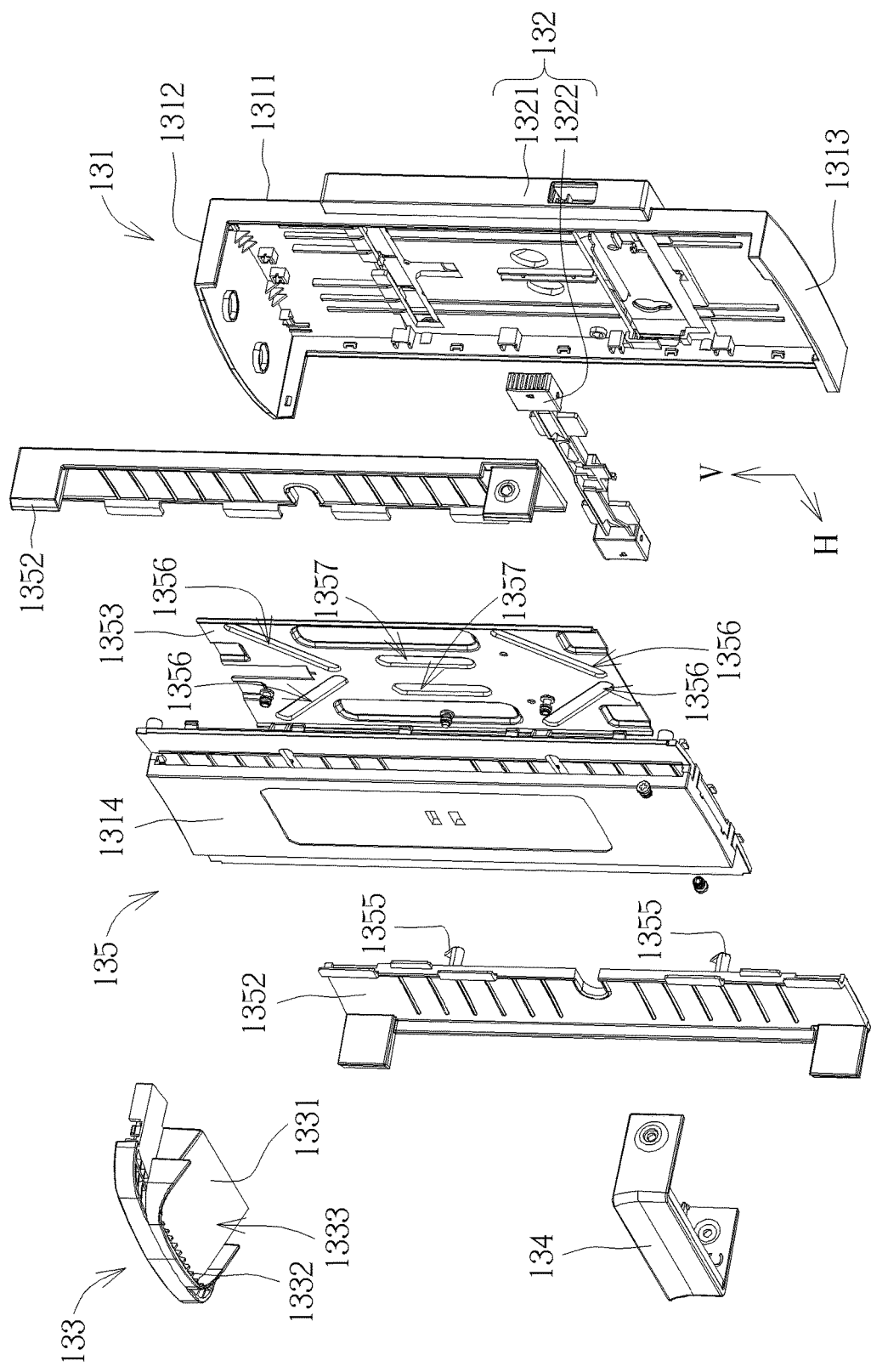
FIG. 5 and FIG. 6 are exploded diagrams of an installation assembly at different views according to the first embodiment of the present disclosure.
Figure 6:
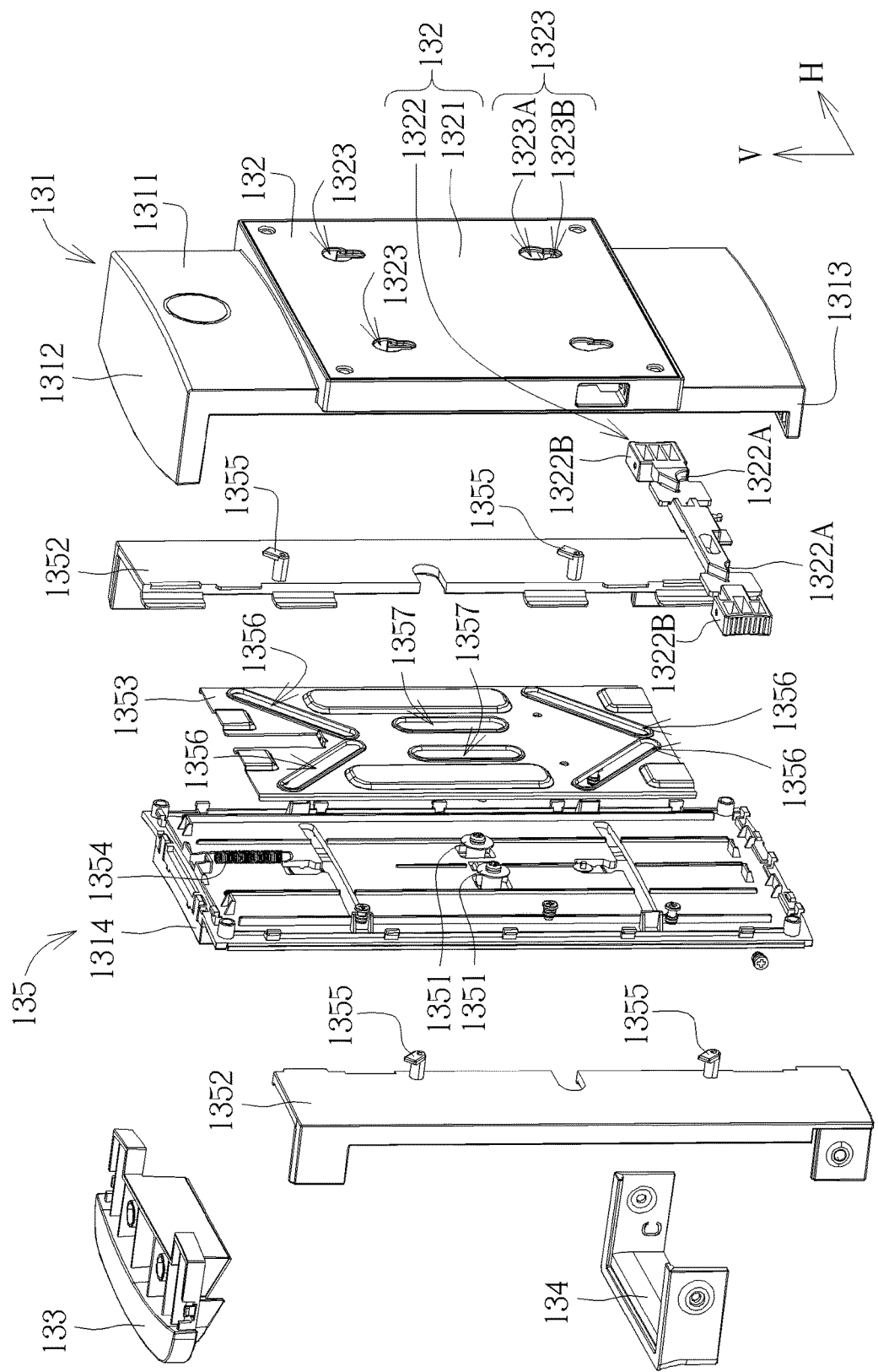

Please refer to FIG. 3 to FIG. 6. FIG. 5 and FIG. 6 are exploded diagrams of the installation assembly 13 at different views according to the first embodiment of the present disclosure. As shown in FIG. 3 to FIG. 6, the installation assembly 13 includes a main body 131, a supporting mechanism 132, an upper engaging component 133, a lower engaging component 134 and a lateral engaging mechanism 135. The supporting mechanism 132 is disposed on a rear side 1311 of the main body 131 away from the supporting frame 112 and configured to mount the extension module 12. The upper engaging component 133 is connected to a top portion 1312 of the main body 131 and configured to engage with a top portion 1121 of the supporting frame 112. The lateral engaging mechanism 135 is movably installed on the main body 131 and configured to abut against two lateral portions 1123 of the supporting frame 112. The lower engaging component 134 is detachably installed on the lateral engaging mechanism 135 and adjacent to a bottom portion 1313 of the main body 131. The bottom portion 1313 of the main body 131 is located at a side of the main body 131 away from the top portion 1312 of the main body 131. The lower engaging component 134, the lateral engaging mechanism 135 and the main body 131 cooperatively surround and restrain a middle portion 1124 of the supporting frame 112, and the middle portion 1124 of the supporting frame 112 is located between the top portion 1211 and a bottom portion 1122 of the supporting frame 112 and adjacent to the bottom portion 1313 of the main body 131. In other words, the upper engaging component 133, the lower engaging component 134 and the lateral engaging mechanism 135 can respectively restrain the top portion 1121, the middle portion 1124 and the two lateral portions 1123 of the supporting frame 112. However, it is not limited thereto. For example, in another embodiment, the lateral engaging mechanism 135 of the installation assembly 13 also can be omitted. The lower engaging component 134 of this embodiment is detachably installed on the bottom portion 1313 of the main body 131 so as to surround and restrain the middle portion 1124 of the supporting frame 112 cooperatively with the main body 131.

Specifically, the upper engaging component 133 includes an abutting portion 1331 and an engaging portion 1332. The abutting portion 1331 is connected to the top portion 1312 of the main body 131 and configured to abut against a top surface 1121A of the top portion 1121 of the supporting frame 112. The engaging portion 1332 is connected to the abutting portion 1331 and configured to abut against four lateral surfaces 1121B of the top portion 1121 adjacent to the top surface 1121A of the top portion 1121. In this embodiment, the engaging portion 1332 can partially surround a periphery of the abutting portion 1331. The abutting portion 1331 and the engaging portion 1332 cooperatively form an accommodating portion 1333 which is configured to accommodate the top portion 1121 of the supporting frame 112, and a shape of the accommodating portion 1333 can be corresponding to a shape of the top portion 1121 of the supporting frame 112. However, the structure of the upper engaging component 133 of the present disclosure is not limited to the one illustrated in the figures of this embodiment. For example, in another embodiment, the engaging portion 1332 can surround the periphery of the abutting portion 1331 entirely or merely be disposed at a front edge of the abutting portion 1331 to restrain the top portion 1121 of the supporting frame 112 by abutting against at least one of the four lateral surfaces 1121B of the top portion 1121 of the supporting frame 112. Furthermore, in this embodiment, the upper engaging component 133 can be replaceable, i.e., the upper engaging component 133 can be connected to the top portion 1312 of the main body 131 in a detachable manner, which allows a user to replace the upper engaging component 133 depending on the size or the shape of the supporting frame 112, so that the installation assembly 13 can be suitable for the different supporting frames 112 with different sizes.

Furthermore, the lateral engaging mechanism 135 includes two guiding columns 1351, two lateral engaging components 1352, a driving component 1353 and a first recovering component 1354. The two guiding columns 1351 are disposed on a front cover 1314 of the main body 131. The two lateral engaging components 1352 are configured to slide relative to the main body 131 along a horizontal direction H to abut against the two lateral portions 1123 of the supporting frame 112 in the horizontal direction H. Two sliding columns 1355 protrude from each of the two lateral engaging components 1352. Four sliding slots 1356 and two guiding slots 1357 are formed on the driving component 1353. A longitudinal direction of each of the four sliding slots 1356 is inclined relative to the horizontal direction H. Each two of the four sliding slots 1356 are arranged in a V shape. Each of the sliding columns 1355 passes through the corresponding sliding slot 1356, so that each of the two lateral engaging components 1352 can be driven by cooperation of the corresponding sliding column 1355 and the corresponding sliding slot 1356 to slide relative to the main body 131 along the horizontal direction H when the driving component 1353 slides relative to the main body 131 along a vertical direction V substantially perpendicular to the horizontal direction H.

A longitudinal direction of each of the two guiding slots 1357 can be substantially parallel to the vertical direction V. Each of the guiding columns 1351 passes through the corresponding guiding slot 1357 to guide the driving component 1353 to slide relative to the main body 131 along the vertical direction V. The first recovering component 1354 is connected to the driving component 1353 and the front cover 1314 of the main body 131 to drive the driving component 1353 to recover along the vertical direction V. In this embodiment, the first recovering component 1354 can be an extensional spring. However, it is not limited thereto. It depends on practical demands. Furthermore, the numbers and the configurations of the guiding column 1351, the lateral engaging component 1352, the driving component 1353, the first recovering component 1354, the sliding column 1355, the sliding slot 1356, and the guiding slot 1357 are not limited to those illustrated in the figures of this embodiment. It depends on practical demands. For example, in another embodiment, the lateral engaging mechanism 135 can only include one guiding column 1351, one lateral engaging component 1352, one sliding column 1355, one sliding slot 1356 and one guiding slot 1357. The lateral engaging mechanism 135 can be configured to abut against one of the two lateral portions 1123 of the supporting frame 112 accordingly.

Besides, the supporting mechanism 132 includes a supporting component 1321 and a restraining component 1322. Four gourd holes 1323 are formed on the supporting component 1321. The four gourd holes 1323 can be arranged at positions conforming to standards and specifications of Video Electronics Standards Association (VESA). Each of the four gourd holes 1323 includes an enlarged portion 1323A and a holding portion 1323B communicated with the enlarged portion 1323A and smaller than the enlarged portion 1323A. The restraining component 1322 includes two restraining portions 1322A and two operating portions 1322B. The two restraining portions 1322A are installed on a side of the two corresponding gourd holes 1323 and are slidable along the horizontal direction H, so as to obstruct the enlarged portions 1323A of the two corresponding gourd holes 1323. The two operating portions 1322B and the two restraining portions 1322A are connected to one another, so as to drive the two restraining portions 1322A to move along the horizontal direction H by operating the two operating portions 1322B. The extension module 12 includes four step screws 121 and a main assembly 122. The four step screws 121 are disposed on the main assembly 122 and located at positions corresponding to the four gourd holes 1323. Each of the four step screws 121 passes through the enlarged portion 1323A of the corresponding gourd hole 1323 and then moves downwardly to engage with the holding portion 1323B of the corresponding gourd hole 1323. However, the numbers and the configurations of the gourd hole 1323, the step screw 121, the restraining portion 1322A and the operating portion 1322B are not limited to those illustrated in the figures of this embodiment. It depends on practical demands. For example, in another embodiment, there can be only one gourd hole 1323 formed on the supporting component 1321. The extension module 12 can only include one step screw 121. The restraining component 1322 can only include one restraining portion 1322A and one operating portion 1322B.

Figure 7:
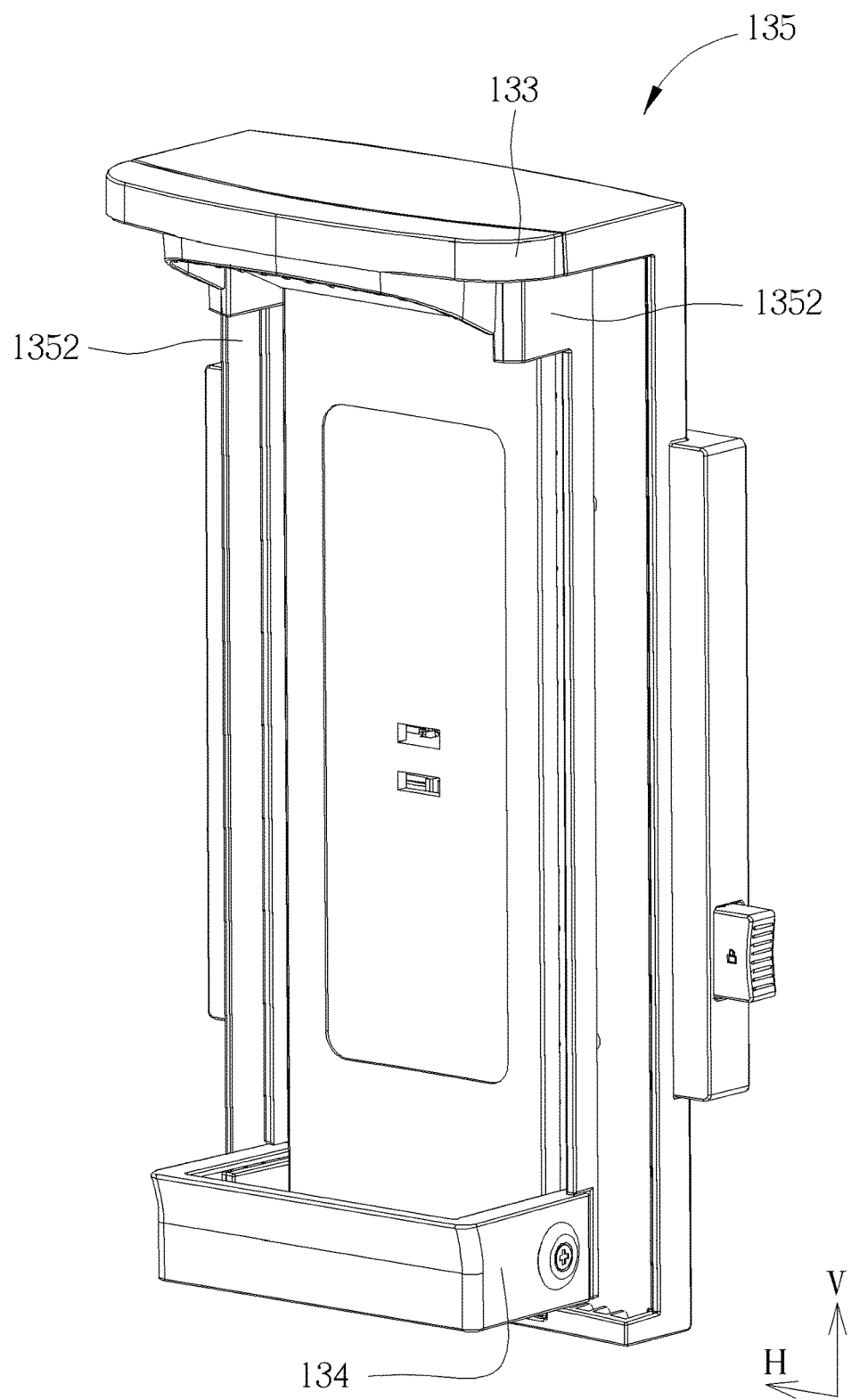
FIG. 7 is a diagram of the installation assembly in a first state according to the first embodiment of the present disclosure.
Figure 8:
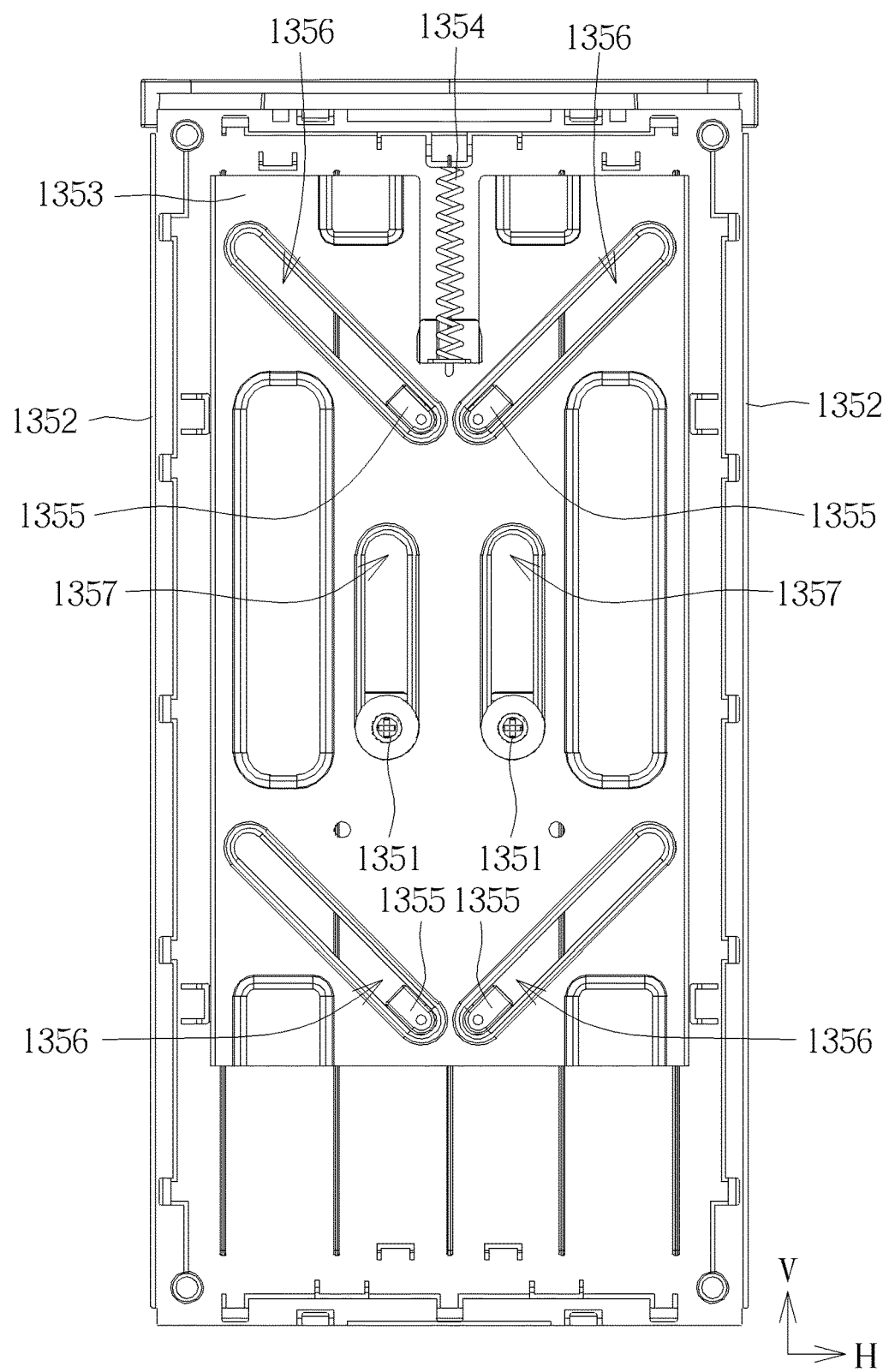
FIG. 8 is an internal structural diagram of the installation assembly in the first state according to the first embodiment of the present disclosure.
Figure 9:
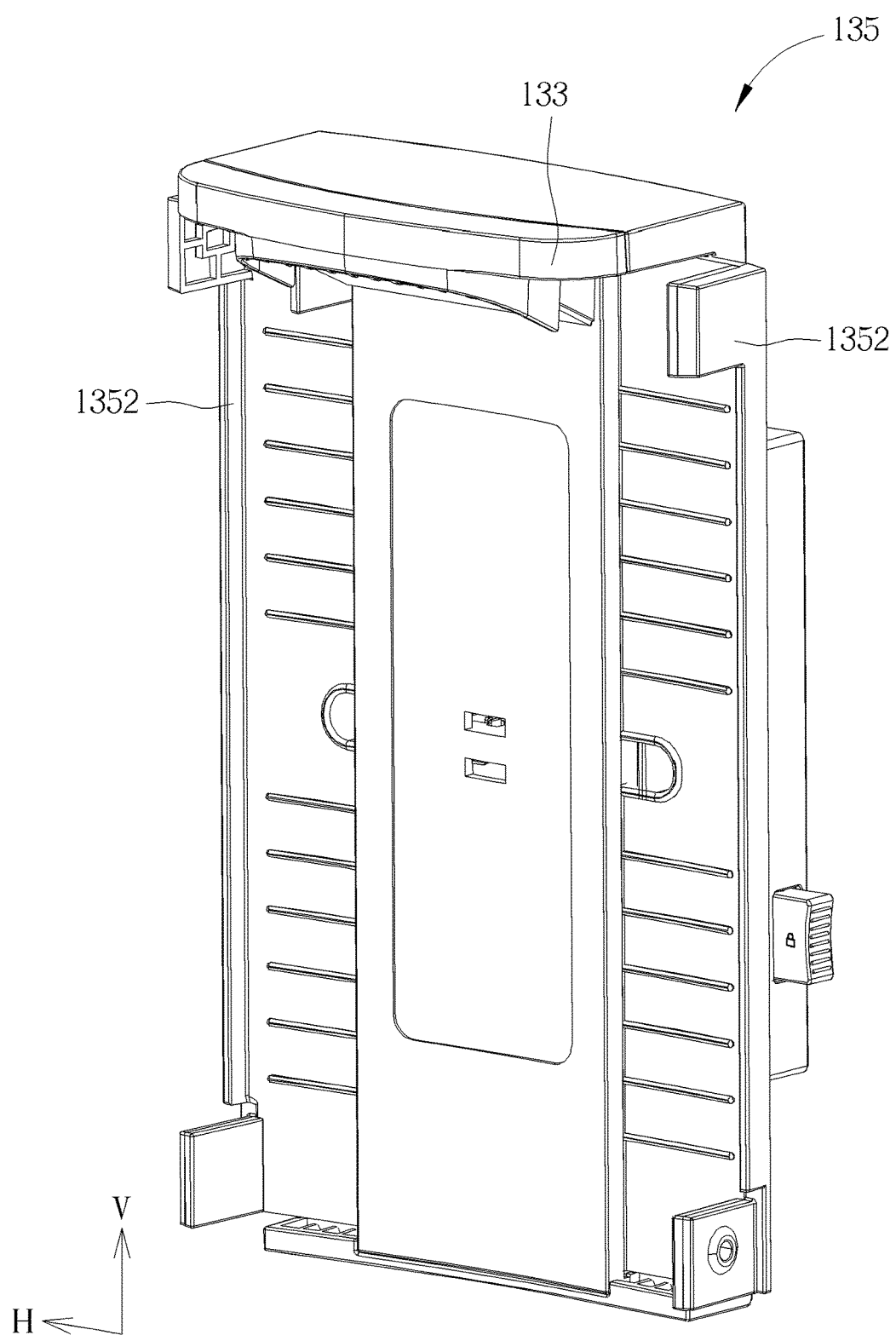
FIG. 9 is a diagram of the installation assembly in a second state according to the first embodiment of the present disclosure.
Figure 10:
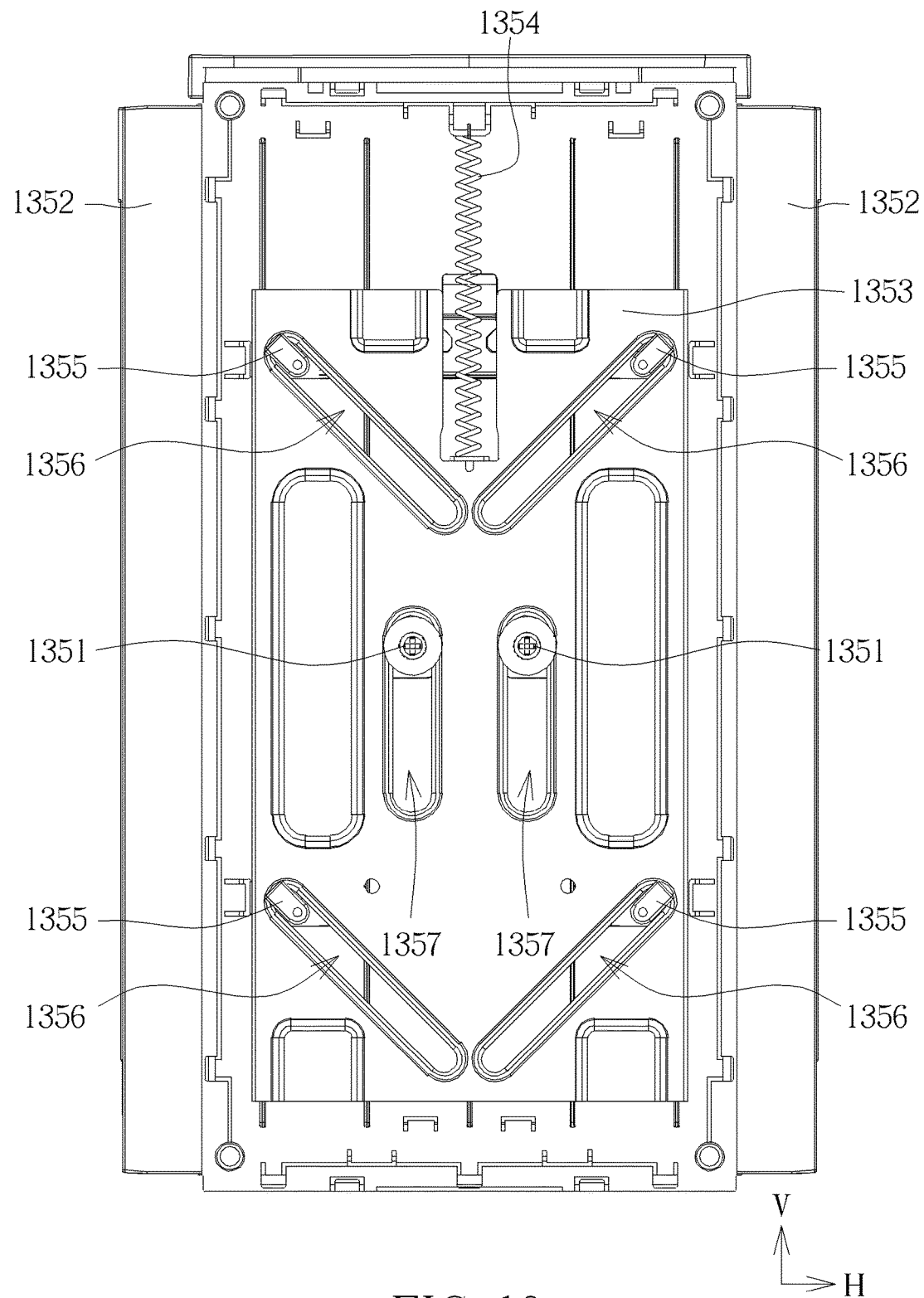
FIG. 10 is an internal structural diagram of the installation assembly in the second state according to the first embodiment of the present disclosure.

Please refer to FIG. 3, FIG. 4 and FIG. 7 to FIG. 10. FIG. 7 is a diagram of the installation assembly 13 in a first state according to the first embodiment of the present disclosure. FIG. 8 is an internal structural diagram of the installation assembly 13 in the first state according to the first embodiment of the present disclosure. FIG. 9 is a diagram of the installation assembly 13 in a second state according to the first embodiment of the present disclosure. FIG. 10 is an internal structural diagram of the installation assembly 13 in the second state according to the first embodiment of the present disclosure. When it is desired to install the installation assembly 13 on the supporting frame 112 of the display module 11, the lower engaging component 134 can be operated to be detached from the lateral engaging mechanism 135 to allow the two lateral engaging components 1352 to be pulled away from each other outwardly along the horizontal direction H, so as to switch the installation assembly 13 from the first state as shown in FIG. 7 to the second state as shown in FIG. 9. During the process of the two lateral engaging components 1352 sliding relative to the main body 131 from positions as shown in FIG. 7 to positions as shown in FIG. 9, the driving component 1353 can be driven by cooperation of an inclined relative motion of the four sliding slots 1356 and the four sliding columns 1355 and cooperation of a straight relative motion of the two guiding slots 1357 and the two guiding columns 1351 to slide relative to the main body 131 from a position as shown in FIG. 8 to a position as shown in FIG. 10, so as to resiliently extend the first recovering component 1354. Afterwards, the upper engaging component 133 can be operated to engage with the top portion 1121 of the supporting frame 112 to restrain the top portion 1121 of the supporting frame 112. At this moment, as long as the two lateral engaging components 1352 are released, the resiliently extended first recovering component 1354 can resiliently recover to drive the driving component 1353 to recover relative to the main body 131 along the vertical direction V upwardly, so as to drive the two lateral engaging components 1352 to slide toward each other relative to the main body 131 along the horizontal direction H until the two lateral engaging components 1352 respectively abut against the two lateral portions 1123 of the supporting frame 112 for fixing the two lateral portions 1123 of the supporting frame 112 with the installation assembly 13. At last, the lower engaging component 134 can be operated to be installed on the bottom portion 1313 of the main body 131 away from the top portion 1312 of the main body 131, so that the lower engaging component 134, the lateral engaging mechanism 135 and the main body 131 cooperatively surround and restrain the middle portion 1124 of the supporting frame 112, which is between the top portion 1211 and the bottom portion 1122 of the supporting frame 112 and adjacent to the bottom portion 1313 of the main body 131, so as to complete installation of the installation assembly 13.

Figure 11:
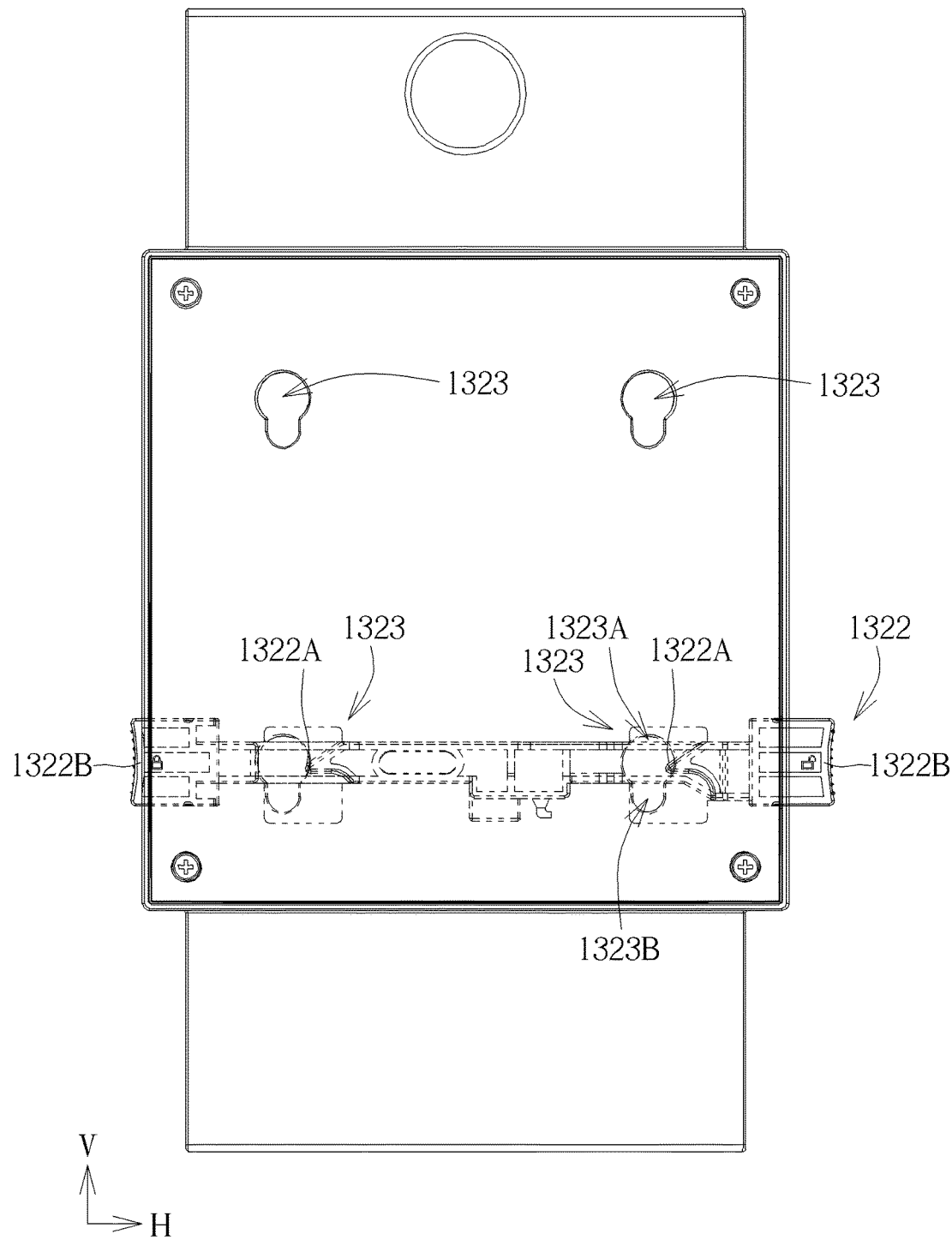
FIG. 11 is an internal structural diagram of the installation assembly with a restraining component at an unlocking position according to the first embodiment of the present disclosure.
Figure 12:
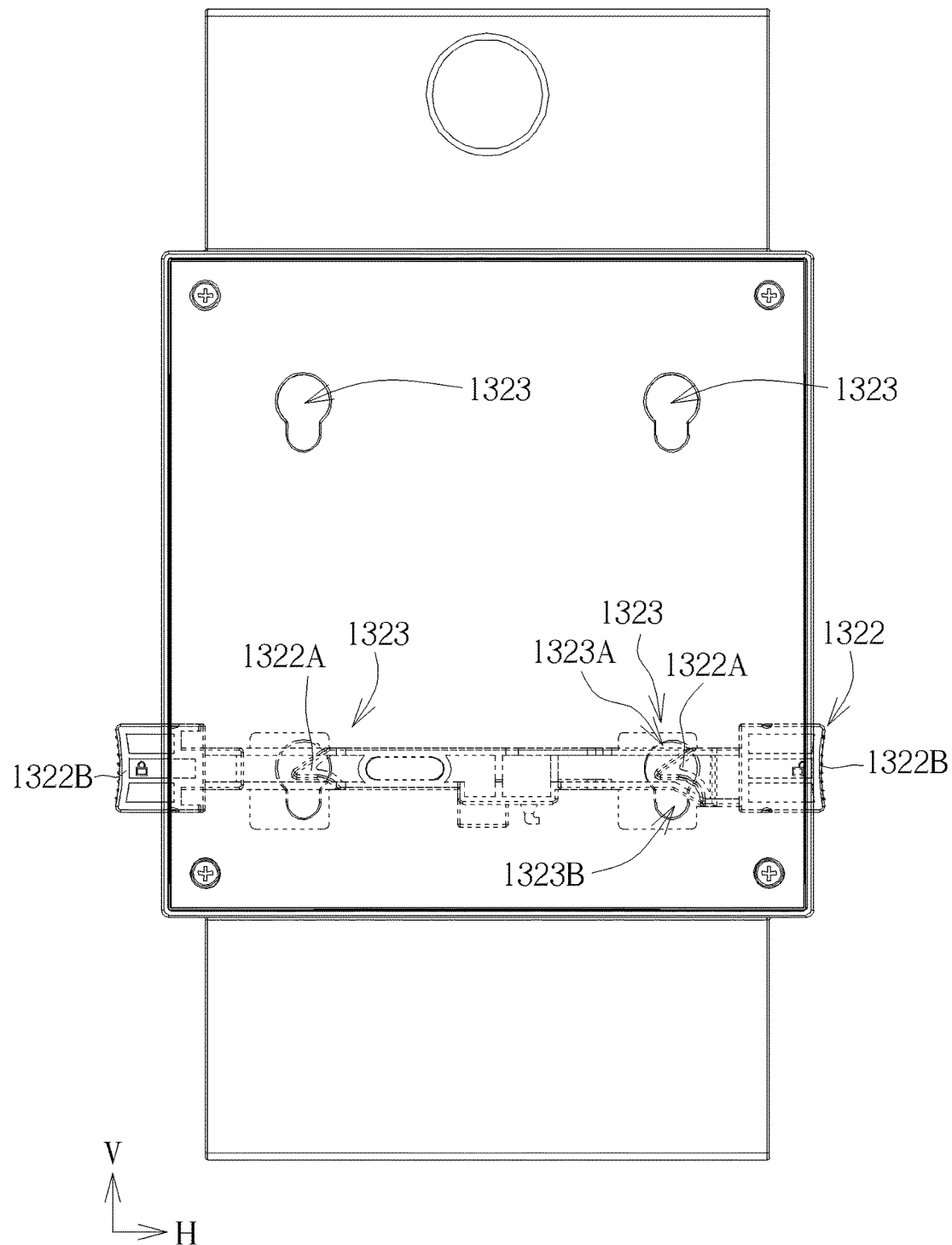
FIG. 12 is an internal structural diagram of the installation assembly with the restraining component at a locking position according to the first embodiment of the present disclosure.

Furthermore, please refer to FIG. 3, FIG. 4, FIG. 11 and FIG. 12. FIG. 11 is an internal structural diagram of the installation assembly 13 with the restraining component 1322 at an unlocking position according to the first embodiment of the present disclosure. FIG. 12 is an internal structural diagram of the installation assembly 13 with the restraining component 1322 at a locking position according to the first embodiment of the present disclosure. As shown in FIG. 11 and FIG. 12, after the installation assembly 13 is installed on the supporting frame 112, the restraining component 1322 can be operated to move to the unlocking position as shown in FIG. 11 to allow each of the four step screws 121 of the extension module 12 to pass through the enlarged portion 1323A of the corresponding gourd hole 1323 and then move downwardly to engage with the holding portion 1323B of the corresponding gourd hole 1323. Afterwards, the operating portion 1322B of the restraining component 1322 at a right side can be operated to drive the restraining component 1332 to move along the horizontal direction H from the unlocking position as shown in FIG. 11 to the locking position as shown in FIG. 12. At this moment, the two restraining portions 1322A move along the horizontal direction H to obstruct the two corresponding enlarged portions 1323A, so as to restrain the two corresponding step screws 121 from entering the two enlarged portions 1323A from the two holding portion 1323B, which can effectively restrain each of the four step screws 121 inside the corresponding holding portion 1323B from disengaging from the corresponding gourd hole 1323 to prevent unintentional disengagement of the extension module 12 and the supporting mechanism 132.

When it is desired to detach the extension module 12, it only has to operate the operating portion 1322B at a left side to drive the restraining component 1322 to move along the horizontal direction H from the locking position as shown in FIG. 12 to the unlocking position as shown in FIG. 11. At this moment, the two restraining portions 1322A move along the horizontal direction H from the locking position as shown in FIG. 12 to the unlocking position as shown in FIG. 11, so as not to obstruct the two corresponding enlarged portions 1323A. Therefore, the extension module 12 can be detached easily as long as each of the four step screws 121 is operated to move upwardly from the corresponding holding portion 1323B to the corresponding enlarged portion 1323A and then disengage from the corresponding gourd hole 1323.

Figure 13:
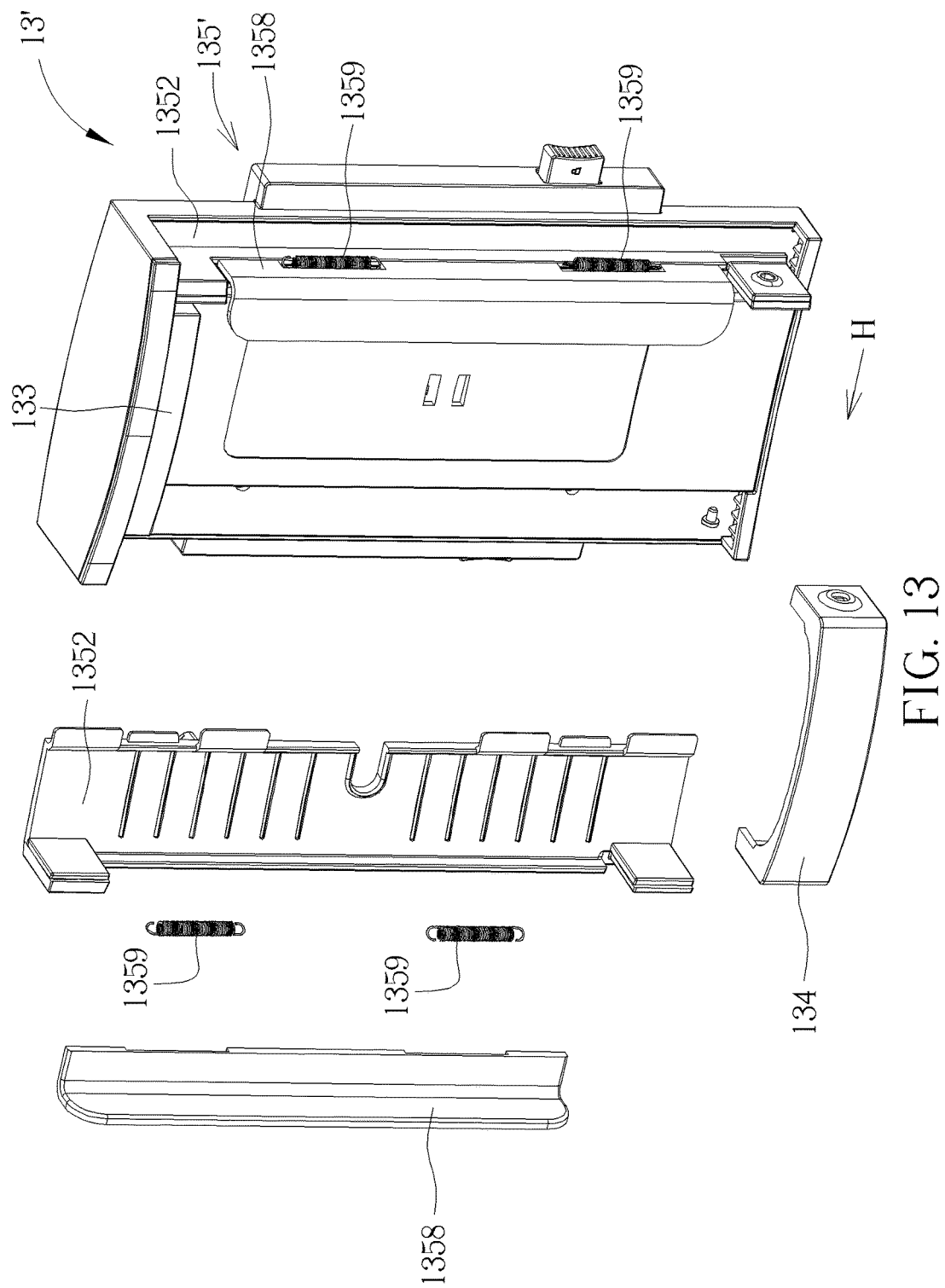
FIG. 13 is a partial exploded diagram of an installation assembly according to a second embodiment of the present disclosure.
Figure 14:
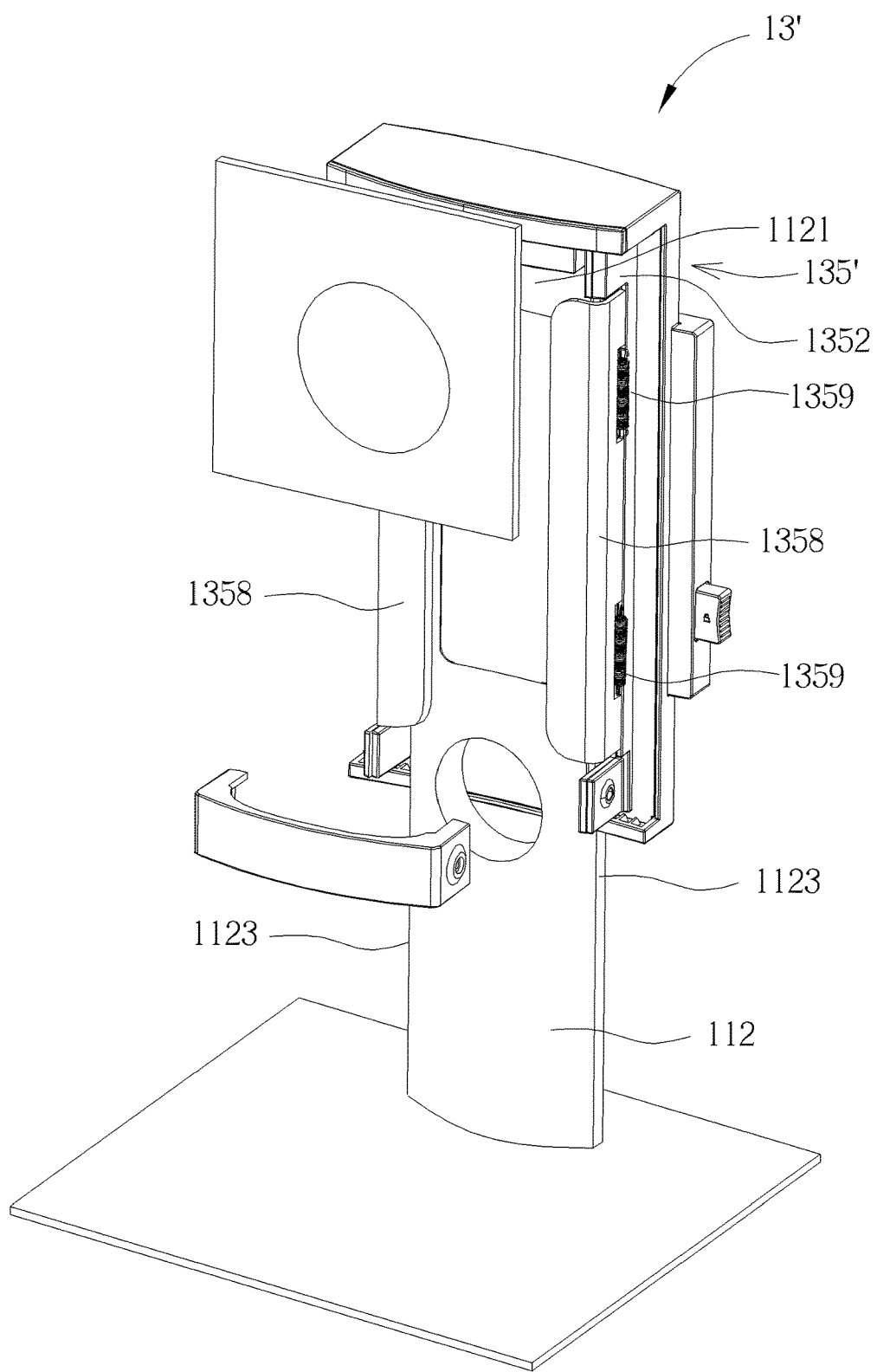
FIG. 14 is an installation diagram of the installation assembly according to the second embodiment of the present disclosure.

Besides, structure of the installation assembly of the present disclosure is not limited to the aforementioned embodiment. For example, please refer to FIG. 13 and FIG. 14. FIG. 13 is a partial exploded diagram of an installation assembly 13' according to a second embodiment of the present disclosure. FIG. 14 is an installation diagram of the installation assembly 13' according to the second embodiment of the present disclosure. As shown in FIG. 13 and FIG. 14, difference between the installation assembly 13 of the first embodiment and the present embodiment resides in that a lateral engaging mechanism 135' of the installation assembly 13' of this embodiment further includes two rotary engaging components 1358 and four second recovering components 1359. The two rotary engaging components 1358 are respectively pivoted to the two lateral engaging components 1352 and configured to rotatably engage with the supporting frame 112. Two of the four second recovering components 1359 are disposed between one of the two rotary engaging components 1358 and the corresponding lateral engaging component 1352, and the other two of the four second recovering components 1359 are disposed between the other one of the two rotary engaging components 1358 and the corresponding lateral engaging component 1352, so as to drive the two rotary engaging components 1358 to rotatably engage with the supporting frame 112. In this embodiment, each of the four second recovering components 1359 can be a torsional spring. However, it is not limited thereto. It depends on practical demands. When it is desired to install the installation assembly 13' on the supporting frame 112, the two lateral engaging components 1352 can be pulled away from each other outwardly along the horizontal direction H, and the two rotary engaging components 1358 can be operated to rotate outwardly. When the upper engaging component 133 of the installation assembly 13' engages with the top portion 1121 of the supporting frame 112, the two lateral engaging components 1352 and the two rotary engaging components 1358 can be released. In such a way, the first recovering component 1354 can drive the driving component 1353 to recover to drive the two lateral engaging components 1352 to recover to abut against the two lateral portions 1123 of the supporting frame 112, and the four second recovering components 1359 can drive the two rotary engaging components 1358 to recover to rotatably engage with the two lateral portions 1123 of the supporting frame 112, so as to complete installation of the installation assembly 13'. Furthermore, in another embodiment, the two lateral engaging components 1352 also can be fixedly disposed on the main body 131, i.e., the two lateral engaging components 1352 are incapable of sliding relative to the main body 131. In other words, in this another embodiment, it only allows a user to operate the two rotary engaging components 1358 to rotatably engage with the two lateral portions 1123 of the supporting frame 112 by the resiliently deformed second recovering components 1359.

In contrast to the prior art, in the present disclosure, the installation assembly can be firmly combined with the supporting frame by the upper engaging component and the lateral engaging mechanism, and the extension module can be mounted on the supporting mechanism of the installation assembly by cooperation of the step screw and the gourd hole. Therefore, it provides a convenient way for a user to quickly assemble or disassemble the extension module without any additional tool. The present disclosure can effectively simplify assembly and disassembly and save time. Furthermore, the upper engaging component and the lateral engaging mechanism of the installation assembly of the present disclosure can be replaced or adjusted according to a shape or a size of the supporting frame of the display module. Therefore, the installation assembly can firmly combined with the supporting frames with different sizes and can be used universally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An installation assembly configured to mount an extension module on a supporting frame, the installation assembly comprising: a main body; a supporting mechanism disposed on a rear side of the main body away from the supporting frame and configured to mount the extension module, the supporting mechanism comprising a supporting component and a restraining component movably installed on the supporting component, at least one gourd hole being formed on the supporting component, the at least one gourd hole comprising an enlarged portion and a holding portion, at least one step screw of the extension module being fixed on the supporting component by the holding portion, the restraining component comprising: at least one restraining portion installed on a side of the at least one gourd hole and slidable along a horizontal direction; and at least one operating portion connected to the at least one restraining portion and configured to drive the at least one restraining portion to move along the horizontal direction to obstruct the enlarged portion, so as to restrain the at least one step screw from entering the enlarged portion from the holding portion; and an upper engaging component connected to a top portion of the main body and configured to engage with a top portion of the supporting frame.

2. The installation assembly of claim 1, wherein the upper engaging component is detachably connected to the top portion of the main body.

3. The installation assembly of claim 1, wherein the upper engaging component comprises an abutting portion and an engaging portion, the abutting portion is connected to the top portion of the main body and abuts against a top surface of the top portion of the supporting frame, and the engaging portion is connected to the abutting portion and abuts against a lateral surface of the top portion adjacent to the top surface of the top portion of the supporting frame.

4. The installation assembly of claim 1, wherein an accommodating portion is formed on the upper engaging component and configured to accommodate the top portion of the supporting frame, and a shape of the accommodating portion is corresponding to a shape of the top portion of the supporting frame.

5. The installation assembly of claim 1, wherein the installation assembly further comprises a lower engaging component adjacent to a bottom portion of the main body and configured to restrain the supporting frame cooperatively with the main body.

6. The installation assembly of claim 1, wherein the installation assembly further comprises a lateral engaging mechanism movably installed on the main body and configured to abut against the supporting frame.

7. The installation assembly of claim 6, wherein the lateral engaging mechanism comprises:
- at least one lateral engaging component, at least one sliding column protruding from the at least one lateral engaging component; and
- a driving component, at least one sliding slot being formed on the driving component, a longitudinal direction of the at least one sliding slot being inclined relative to a horizontal direction, the at least one sliding column slidably passing through the at least one sliding slot, when the driving component slides relative to the main body along a vertical direction perpendicular to the horizontal direction, the at least one lateral engaging component being driven by cooperation of the at least one sliding column and the at least one sliding slot to slide relative to the main body along the horizontal direction to abut against the supporting frame in the horizontal direction.

8. The installation assembly of claim 7, wherein the lateral engaging mechanism further comprises at least one guiding column disposed on the main body, at least one guiding slot is formed on the driving component, a longitudinal direction of the at least one guiding slot is parallel to the vertical direction, and the at least one guiding column slidably passes through the at least one guiding slot to guide the driving component to slide relative to the main body along the vertical direction.

9. The installation assembly of claim 8, wherein the lateral engaging mechanism further comprises a first recovering component connected to the driving component and the main body to drive the driving component to recover along the vertical direction.

10. The installation assembly of claim 7, wherein the lateral engaging mechanism further comprises at least one rotary engaging component pivoted to the at least one lateral engaging component and configured to rotatably engage with the supporting frame.

11. The installation assembly of claim 10, wherein the lateral engaging mechanism further comprises at least one second recovering component disposed between the at least one rotary engaging component and the at least one lateral engaging component to drive the at least one rotary engaging component to rotatably engage with the supporting frame.

12. A display device comprising: a display module comprising: a monitor configured to display images; and a supporting frame configured to support the monitor; an extension module; and an installation assembly configured to mount the extension module on the supporting frame, the installation assembly comprising: a main body; a supporting mechanism disposed on a rear side of the main body away from the supporting frame and configured to mount the extension module, the supporting mechanism comprising a supporting component and a restraining component movably installed on the supporting component, at least one gourd hole being formed on the supporting component, the at least one gourd hole comprising an enlarged portion and a holding portion, at least one step screw of the extension module being fixed on the supporting component by the holding portion, the restraining component comprising: at least one restraining portion installed on a side of the at least one gourd hole and slidable along a horizontal direction; and at least one operating portion connected to the at least one restraining portion and configured to drive the at least one restraining portion to move along the horizontal direction to obstruct the enlarged portion, so as to restrain the at least one step screw from entering the enlarged portion from the holding portion; and an upper engaging component connected to a top portion of the main body and configured to engage with a top portion of the supporting frame.

13. The display device of claim 12, wherein an accommodating portion is formed on the upper engaging component and configured to accommodate the top portion of the supporting frame, and a shape of the accommodating portion is corresponding to a shape of the top portion of the supporting frame.

14. The display device of claim 12, wherein the installation assembly further comprises a lower engaging component adjacent to a bottom portion of the main body and configured to restrain the supporting frame cooperatively with the main body.

15. The display device of claim 12, wherein the installation assembly further comprises a lateral engaging mechanism movably installed on the main body and configured to abut against the supporting frame, the lateral engaging mechanism comprises:
- at least one guiding column disposed on the main body;
- at least one lateral engaging component, at least one sliding column protruding from the at least one lateral engaging component;
- a driving component, at least one sliding slot and at least one guiding slot being formed on the driving component, a longitudinal direction of the at least one sliding slot being inclined relative to a horizontal direction, a longitudinal direction of the at least one guiding slot being parallel to a vertical direction perpendicular to the horizontal direction, the at least one sliding column slidably passing through the at least one sliding slot, the at least one lateral engaging component being driven by cooperation of the at least one sliding column and the at least one sliding slot to slide relative to the main body along the horizontal direction to abut against the supporting frame in the horizontal direction when the driving component slides relative to the main body along the vertical direction, and the at least one guiding column slidably passing through the at least one guiding slot to guide the driving component to slide relative to the main body along the vertical direction; and a first recovering component connected to the driving component and the main body to drive the driving component to recover along the vertical direction.

16. The display device of claim 15, wherein the lateral engaging mechanism further comprises:

at least one rotary engaging component pivoted to the at least one lateral engaging component and configured to rotatably engage with the supporting frame; and at least one second recovering component disposed between the at least one rotary engaging component and the at least one lateral engaging component to drive the at least one rotary engaging component to rotatably engage with the supporting frame.

\* \* \* \* \*

UNITED STATES PATENT AND TRADEMARK OFFICE
CERTIFICATE OF CORRECTION

PATENT NO. : 10,473,259 B1  
APPLICATION NO. : 16/181347  
DATED : November 12, 2019  
INVENTOR(S) : Kuang-Wen Chen et al.

Page 1 of 1

It is certified that error appears in the above-identified patent and that said Letters Patent is hereby corrected as shown below:

On the Title Page

Item (73), correct the name of the assignee from "Winstron Corporation" to --Wistron Corporation--.

Signed and Sealed this  
Twenty-fourth Day of December, 2019

Andrei Iancu  
*Director of the United States Patent and Trademark Office*